US012703610B2

(12) United States Patent
Probell et al.

(10) Patent No.: US 12,703,610 B2
(45) Date of Patent: Aug. 11, 2026

(54) MOTOR UNIT FOR A TELESCOPIC POLE ASSEMBLY

(71) Applicant: SKYLOTEC GMBH, Neuwied (DE)

(72) Inventors: Henrik Probell, Neuwied (DE); Alexey Binogerov, Neuwied (DE); Jimmy Eiterjord, Neuwied (DE)

(73) Assignee: SKYLOTEC GMBH, Neuwied (DE)

( * ) Notice: Subject to any disclaimer, the term of this patent is extended or adjusted under 35 U.S.C. 154(b) by 96 days.

(21) Appl. No.: 18/866,409

(22) PCT Filed: May 15, 2023

(86) PCT No.: PCT/EP2023/063024
§ 371 (c)(1),
(2) Date: Nov. 15, 2024

(87) PCT Pub. No.: WO2023/222630
PCT Pub. Date: Nov. 23, 2023

(65) Prior Publication Data

US 2025/0340408 A1 Nov. 6, 2025

(30) Foreign Application Priority Data

May 16, 2022 (EP) .................................... 22173586
Jun. 9, 2022 (EP) .................................... 22178243

(51) Int. Cl.
*B25G 1/04* (2006.01)
*B66D 1/06* (2006.01)
(Continued)

(52) U.S. Cl.
CPC ................. *B66D 1/12* (2013.01); *B66D 1/06* (2013.01); *B66D 1/7489* (2013.01)

(58) Field of Classification Search
CPC ......... A47L 9/32; A47L 11/4075; B25G 1/04; B25G 1/06; B25G 3/12; B25G 3/18;
(Continued)

(56) References Cited

U.S. PATENT DOCUMENTS 3,799,005 A 3/1974 Koehler
4,924,573 A * 5/1990 Huddleston ........... A01G 3/086
30/296.1

(Continued)

FOREIGN PATENT DOCUMENTS

CN 205712977 U * 11/2016
DE 2121017 A1 * 11/1972

(Continued)

OTHER PUBLICATIONS

Extended European Search Report received in corresponding Application No. 22178243.6, dated Dec. 9, 2022, 7 pages.

(Continued)

*Primary Examiner* — Chuck Y Mah
(74) *Attorney, Agent, or Firm* — Dority & Manning, P.A.

(57) ABSTRACT

The present invention relates to a motor unit configured for actuating a rope of in particular a telescoping pole assembly including a telescopic pole, including a motor, a wheel comprising a rotatable wheel drum for receiving the rope, whereby an axis engage means is slidable between a first position in which the motor is torque-proof connected to the wheel and a second position in which the connection of the motor is released from the wheel is foreseen. The invention also relates to in particular a telescopic pole assembly comprising a telescopic pole with a rope connected thereto and the motor unit. The invention further relates to a method for switching between a motor operation of in particular a telescopic pole assembly and a manual operation of in particular the telescopic pole assembly and to a method for (Continued)

switching between a manual operation and a motor operation of in particular a telescopic pole assembly.

12 Claims, 5 Drawing Sheets

(51) Int. Cl.
*B66D 1/12* (2006.01)
*B66D 1/74* (2006.01)

(58) Field of Classification Search
CPC ..... B25G 3/04; B05C 17/0205; B66F 11/046; B66D 1/12; B66D 1/7489; F16B 7/10; F16B 7/105; F16B 7/042; B21D 39/04; B21D 39/046; B21D 39/048; B65H 2402/412; B65H 54/585; B65H 75/4486
See application file for complete search history.

(56) References Cited

U.S. PATENT DOCUMENTS

| | | | | | |
|---|---|---|---|---|---|
| 5,163,650 | A * | 11/1992 | Adams | E04H 12/182 248/405 |
| 5,862,885 | A * | 1/1999 | Carmitchel | B66F 9/08 187/244 |
| 5,871,069 | A * | 2/1999 | Carmitchel | B66F 9/08 254/365 |
| 5,881,601 | A * | 3/1999 | Hammer | F16M 11/18 74/29 |
| 6,494,636 | B1 * | 12/2002 | Mozena | A63C 11/221 403/349 |
| 7,966,777 | B2 * | 6/2011 | Douglas | E04H 12/182 52/118 |
| 8,191,322 | B2 * | 6/2012 | Liestenfeltz | H01Q 1/1235 52/118 |
| 9,009,920 | B1 * | 4/2015 | Ramsey | B05C 17/0205 16/436 |
| 9,009,921 | B1 * | 4/2015 | Ramsey | B25G 1/04 16/436 |
| 9,610,678 | B2 * | 4/2017 | Shields | B25G 1/04 |
| 10,131,524 | B2 | 11/2018 | Wilkins et al. | |
| 10,801,229 | B1 * | 10/2020 | George, Sr. | E04H 12/32 |
| 2002/0053617 | A1 | 5/2002 | Nanbu | |
| 2009/0110527 | A1 * | 4/2009 | Kardohely | E04H 12/182 414/567 |
| 2009/0145056 | A1 * | 6/2009 | Pereira | E04H 12/182 52/111 |
| 2016/0061241 | A1 * | 3/2016 | Hansen | F16B 7/105 403/377 |
| 2018/0111703 | A1 * | 4/2018 | Hensley | B64G 1/2225 |
| 2018/0172062 | A1 * | 6/2018 | Hu | F16H 25/2056 |
| 2022/0088498 | A1 * | 3/2022 | Shilo | F16B 7/105 |
| 2023/0157426 | A1 * | 5/2023 | Lv | A45B 19/08 135/25.4 |
| 2023/0278189 | A1 * | 9/2023 | Gordon | B25G 1/04 16/429 |

FOREIGN PATENT DOCUMENTS

| | | | | | |
|---|---|---|---|---|---|
| EP | 2743230 | A1 * | 6/2014 | B66D 1/06 |
| KR | 20160130553 | A * | 11/2016 | G03B 17/561 |
| WO | WO-02066771 | A1 * | 8/2002 | E04H 12/182 |

OTHER PUBLICATIONS

International Search Report and Written Opinion received in corresponding Application No. PCT/EP2023/063024, dated Jul. 19, 2023, 14 pages.

* cited by examiner

MOTOR UNIT FOR A TELESCOPIC POLE ASSEMBLY

CROSS-REFERENCE TO RELATED APPLICATIONS

This application is the U.S. National Stage entry of International Application No. PCT/EP2023/063024, filed on May 15, 2023, which, in turn, claims priority to EP patent application Ser. No. 22/173,586.3, filed on May 16, 2022, and EP patent application Ser. No. 22/178,243.6, filed on Jun. 9, 2022, all of which are hereby incorporated herein by reference in their entireties for all purposes.

TECHNICAL FIELD

The present invention relates to a motor unit in particular for a telescopic pole assembly, the motor unit being configured to provide a secure transition from a motor operation in particular of the telescopic pole assembly to a manual operation in particular of the telescopic pole assembly. The invention also relates to a method for switching between a motor operation of in particular a telescopic pole assembly and a manual operation of in particular the telescopic pole assembly.

BACKGROUND OF THE INVENTION

Telescopic poles are e.g., designed to place a hook on top of a high target out of reach from an operator. The hook can hold a rope, ladder or net that the operator then can use to ascend up to the target. Such telescopic poles comprise a rope connected thereto and a winch configured for actuating the rope for telescoping the pole. There are however many examples of where it would be desirable to have access to an electrically operated telescopic pole assembly, preferable with motor unit that can be operated by the person ascending or descending the rope. Such scenarios include for example rescue operations and military operations. Electrically operated telescopic poles allow personnel to extend the telescopic pole quickly and easily to securely attach hooks or ladder systems to a wall, for example. Theses electrically operated telescopic poles comprise a telescopic pole with a rope connected thereto and a motor unit configured for actuating the rope for telescoping the pole. In the event of motor unit failure due to low battery, electrical malfunction or mechanical gearbox failure there is a need to manually extend the pole. This failure may happen halfway up, with load on the wire rope.

From the state of the art telescopic pole assemblies are known comprising a telescopic pole with a rope connected thereto and a motor unit configured for actuating the rope for telescoping the pole. It is also known that these telescopic pole assemblies can be switched from a motor operation of the telescopic pole to a manual operation using a manual handle for actuating the rope. The problem is that at a certain point the manual handle is disengaged from the motor and the load on the rope is transferred to the manual handle when switching from motor operation to manual operation. If the user is not holding the handle the pole will collapse potential causing injury to the operator.

Although the above-mentioned state of the art is a very useful solution for rope access to heights by means of electric telescopic poles, there is always a desire to introduce further improvements to protect personnel from harm. In particular, there is a desire to minimize the risks associated with working with heavy loads and thus improve the environment for users of such equipment.

It is therefore the object of the present invention to make the transition from a motor operation of the telescopic pole to a manual operation of the telescopic pole more secure.

SUMMARY OF THE INVENTION

According to a first aspect of the invention, the above is at least partly alleviated by a motor unit configured for actuating a rope in particular of a telescoping pole assembly comprising a telescopic pole, comprising a motor, a wheel comprising a rotatable wheel drum for receiving the rope, the wheel further comprising a rotating arm for manually operating the wheel, which rotating arm is axially extendable between a motor operated position and a manually operated position, a slidable axis engage means configured for torque-proof connecting the motor and the wheel in a first position only when the rotating arm is in the motor operated position and configured for releasing the connection between motor and the wheel in a second position only when the rotating arm is in the manually operated position, a kinematic means configured to move the axis engage means from the first position to the second position when the rotating arm is in the manually operated position. Operation of the rope is achieved by the wheel rotating together with the motor in forward or reverse operation, causing the rope to wind or unwind on the wheel drum. In manual mode, the wheel is uncoupled from the main motor and can rotate freely.

According to a key aspect of the proposed solution, when switching to manual operation under load, the slidable arranged axis engage means will stay connected to the wheel, due to friction, until the wheel is manually rotated. Only when the pressure is removed from the connection when the arm is actuated, the axis engage means is released by means of the kinematic means and moved from the first position to the second position. By means of the slidable arranged axis engage means a secure transition from a motor operation of in particular the telescopic pole assembly to a manual operation of in particular the telescopic pole assembly is ensured, in particular when the motor fails.

Within the context of the application, the term axis engage means should be interpreted broadly, and may comprise any type of component that can provide a torque-proof connecting between the motor and the wheel. The torque-proof connecting between the motor and the wheel by the axis engage means can be made in a variety of ways. For example, various form-fit but also force-fit connections can be provided. The term rope is here used in its broader sense and is intended to include ropes, wires, belts, webbing, and cords of whatever nature or size suitable for use with the wheel drum. As understood by this definition, the rope may have a circular, elliptic of essentially flat (e.g., rectangular) form.

In a preferred embodiment, the rotating arm comprises a recess configured for securing the torque-proof connection between the motor and the wheel by means of the axis engage means when the rotating arm is in motor operated position. By means of the recess, it can be ensured that the connection between the motor and the wheel cannot be loosened when the rotating arm is in motor operated position during motor operation. The recess can be designed almost arbitrarily. To secure the torque-proof connection between the motor and the wheel, various form-fitting connections between the rotating arm and the axis engage means can be provided.

In an embodiment, the motor unit comprises a drive shaft arranged between the motor and wheel, and the axis engage means is positively connected to the drive shaft in the first position thereby establishing the torque-proof connection between motor and wheel. As mentioned above, the motor is connected to the wheel using the drive shaft. The expression "drive shaft" may include any mechanical implementation for transferring a rotational force from the motor to the wheel. As such, the drive shaft may for example further include a gearbox or similar for adapting the rotational force to suit the rotational speed of the wheel. Positive-locking connections are created by the interlocking of at least two connection partners. As a result, the connection partners cannot disengage even without or with interrupted force transmission. In particular, however, the connection is set up in such a way that when switching to manual operation under load, the slidable arranged axis engage means will stay connected to the wheel, due to friction, until the wheel is manually rotated. Only when the pressure is removed from the connection when the arm is actuated, the axis engage means is released by means of the kinematic means and moved from the first position to the second position. The connection between the axis engage means and the drive shaft can be made in a variety of ways. For example, various form-fit but also force-fit connections can be provided.

In another embodiment, an end section of the drive shaft is hexagonal in shape and the axis engage means includes a receptacle corresponding in shape to thereby providing the torque-proof connection between the drive shaft and the drum wheel. By means of a hexagonal shape of the end section of the drive shaft a positive but detachable connection can be achieved. For this purpose, in particular the corresponding recess of the axis engage means is designed in such a way that the connection can be separated again, for example by moving the axis engage means in a certain direction. Nevertheless, the end section may have any shape that allows it to connect with the axis engage means. Other types of connections, such as shaft-hub connections, may also be provided to transmit torque and power from the drive shaft to the axis engage means.

In an embodiment, the wheel comprises a manual handle retractably connected to the rotating arm configured for manually rotating the wheel by the rotating arm when the rotating arm is in the manually operated position. A retractable handle has the advantage of not hindering during motor operation. In further embodiments of the invention, however, the handle may also be connected to the arm in a plug-in manner, for example.

In a preferred embodiment, the wheel comprises a lock configured for locking the rotating arm in the motor operated position or in the manually operated position. By means of the lock, it can be ensured that the rotary arm does not come loose during motor operation and is unintentionally moved to the position for manual operation.

Preferably, in one embodiment the lock has a detent mechanism with a kinematic means configured for locking the rotating arm in the motor operated position or in the manually operated position. By means of the detent mechanism and the kinematic means, it can be ensured that the arm can be automatically secured in the corresponding position. In particular, this can also be understood to include releasable fastening devices with snap-action in which the stud, pin, or spigot has a resilient part.

In a preferred embodiment, the wheel comprises a disengage lever configured for releasing the torque-proof connection between motor and wheel upon activation the disengage lever, by means of the axis engage means when the rotating arm is in the manually operated position. On the one hand, the disengage lever is useful for manually releasing the axis engage means when switching from motor operation to manual operation should it jam or hook, for example, and on the other hand, the disengage lever is useful for being able to switch back from manual operation to motor operation under load and to ensure that a secure torque-proof connection has been made between the motor and the wheel.

According to another aspect of the invention a telescopic pole assembly comprising a telescopic pole with a rope connected thereto and the motor unit as described above is foreseen.

According to further aspect of the invention the above is at least partly alleviated by a method for switching between a motor operation of in particular a telescopic pole assembly and a manual operation of in particular the telescopic pole assembly the method comprising the following steps:

Providing a motor unit as described above,

Axially extending the rotary arm of the wheel of the motor unit into the manually operated position, Rotating the rotating arm, by which the axis engage means is moved from the first position in which the motor is torque-proof connected to the wheel to the second position in which the connection of the motor is released from the wheel by means of the kinematic means.

In a preferred embodiment, the wheel comprises a disengage lever, the method comprising the following additional step:

Actuating the disengage lever in case the axis engage means is jammed whereby the axis engage means is moved from the first position to the second position by means of the kinematic means. When switching between motor operation and manual operation, the release lever is useful if the axis engagement should jam or hook, for example. When the disengage lever is actuated the axis engage means is moved from the first position in which the motor is torque-proof connected to the wheel to the second position in which the connection of the motor is released from the wheel. This process can be completely manual or supported by the kinematic means.

According to another aspect of the invention a method for switching between a manual operation and a motor operation of in particular a telescopic pole assembly is foreseen, the method comprising the following steps:

Providing a motor unit as described above, wherein the wheel comprises a disengage lever configured for releasing the torque-proof connection between motor and wheel upon activation of the disengage lever by means of the axis engage means when the rotating arm is in the manually operated position by pushing the disengage lever from a first position to a second position, the disengage lever being subsequently in the second position, Pushing back the disengage lever towards its first position, while rotating the wheel to find a correct angle for alignment of the axis engage means for the torque-proof connecting between the motor and the wheel, Pushing the disengage lever all the way to its first position, when the axis engage means is aligned for the torque-proof connecting between the motor and the wheel, wherein once the disengage lever is in its first position, a holding force may be released from the rotating arm and the axis engage means will start to transfer a torque to the motor by means of the torque-proof connecting between the motor and the wheel, Axially retracing the rotary arm of the wheel of the motor unit into the motor operated position. If a switch is to be made from manual operation to motor operation under load, the disengage lever is helpful in ensuring that a secure torque-proof connection has been made between the motor and the wheel. After that a holding force may be released from the rotating arm and the axis engage means will start to transfer a torque to the motor by means of the torque-proof connecting between the motor and the wheel.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
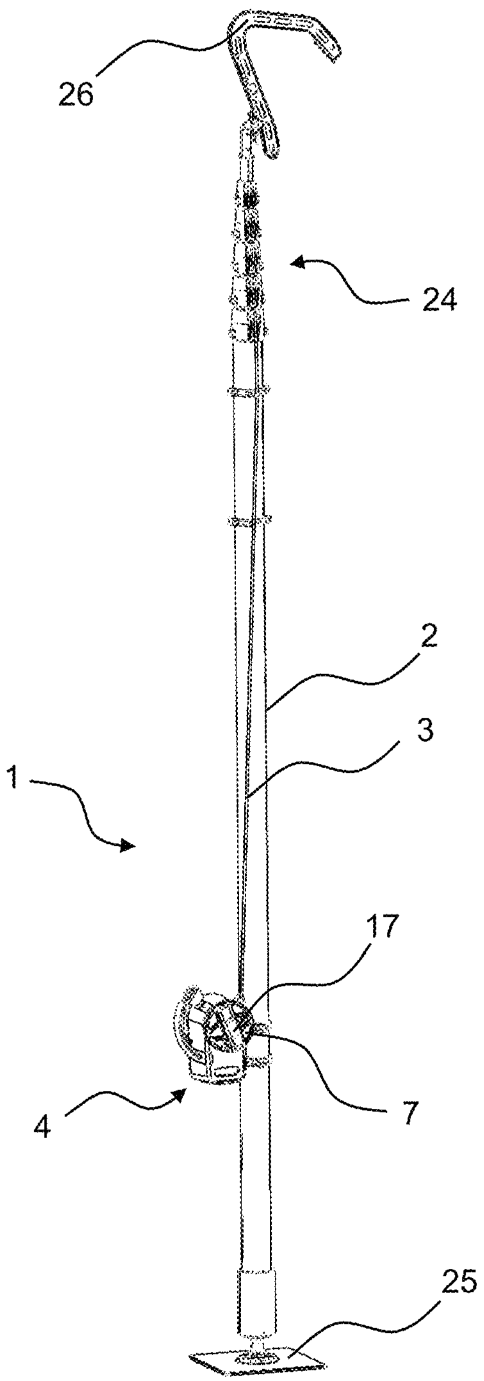
FIG. 1 shows a telescopic pole assembly comprising a motor unit according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a telescopic pole assembly 1 comprising a motor unit 4 according to an embodiment of the invention. The telescopic pole assembly 1 is designed to place a hook 26 on top of a high target out of reach from an operator. The hook 26 can hold a rope, ladder or net that the operators then can use to ascend to the target. The telescopic pole 2 contains e.g., five internal smaller pole sections 24 that are extended by an electrical motor unit 4, pulling a rope 3 on the outside of the pole 2. Furthermore, the pole 2 includes a base plate 25 to safely position the pole on the floor. Details of the motor unit 4 are described with reference to the following figures.

Figure 2:
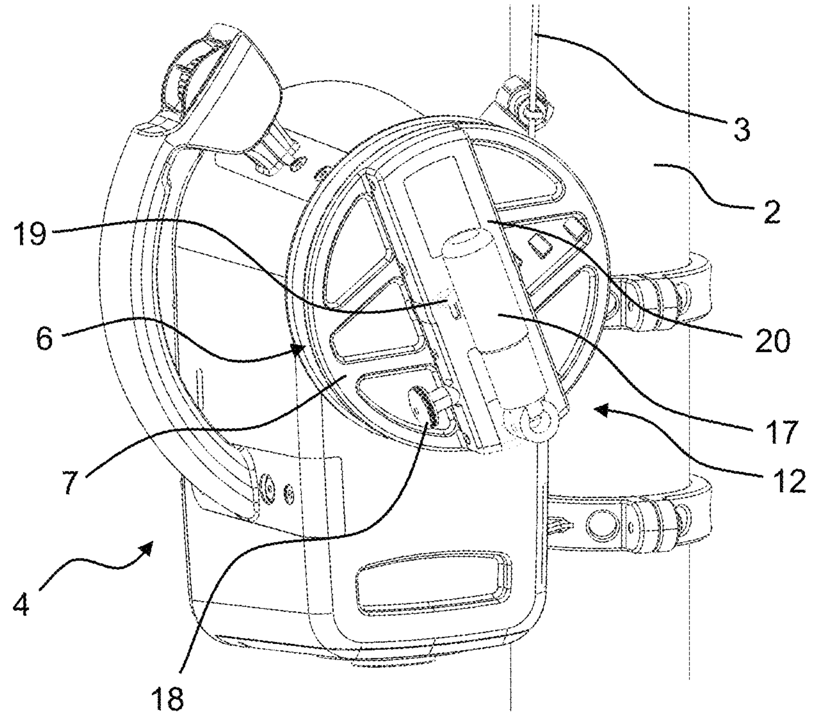
FIG. 2 shows a perspective view of a motor unit according to an embodiment of the invention.

FIG. 2 shows a perspective view of a motor unit 4 according to an embodiment of the invention. The motor unit 4 comprises a motor 5, which is arranged inside the motor unit 4 and is therefore not visible in FIG. 2. Furthermore, the motor unit 4 includes a wheel 7 comprising a rotatable wheel drum 6 for receiving the rope 3. The wheel 7 further comprises a rotating arm 8 for manually operating the wheel drum 6. The rotating arm 8 is axially extendable between a motor operated position 12 and a manually operated position 13. Furthermore, a lock 18 for locking the rotating arm 8 in the motor operated position 12 or in the manually operated position 13. In FIG. 2 the rotating arm 8 is locked in the motor operated position 12.

Figure 3:
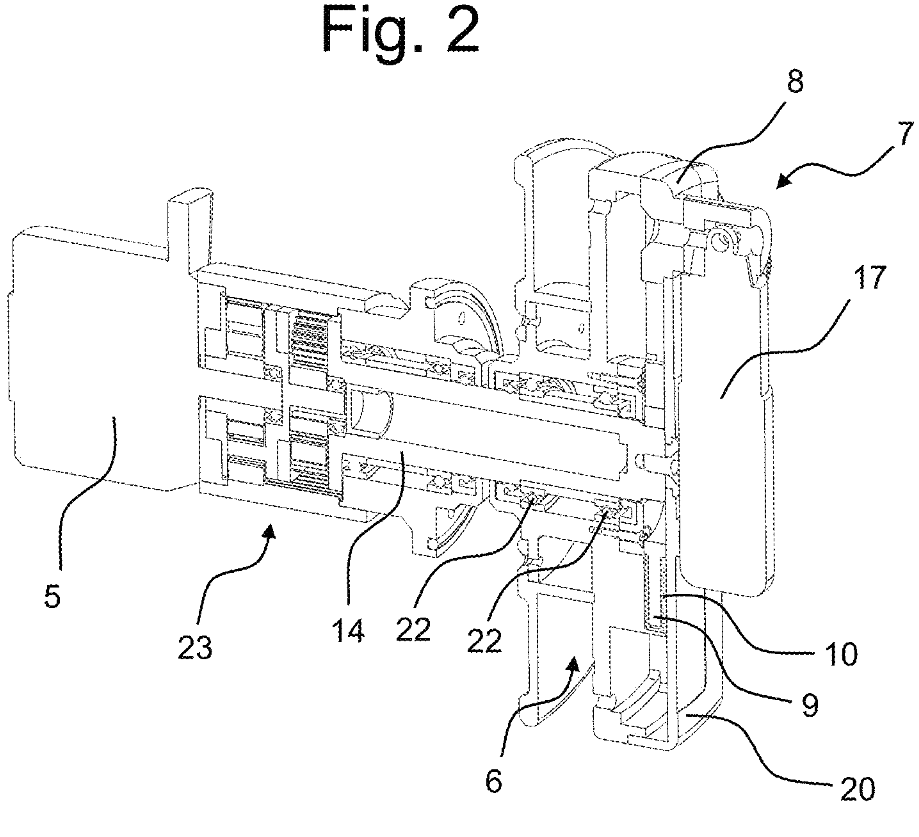
FIG. 3 shows a sectional view of the motor unit according to an embodiment of the invention.

FIG. 3 shows a sectional view of the motor unit 4 according to an embodiment of the invention. The motor unit 4 comprises a motor 5 connected to the wheel 7 with a wheel drum 6 via a gearbox 23 and drive shaft 14. To enable the motor 5 to turn the wheel 7 and thus the wheel drum 6, a torque-proof connection is made between the motor 5 and the wheel 7 via an axis engage means 9. The axis engage means 9 is further configured for torque-proof connecting the motor 5 and the wheel 7 only when the rotating arm 8 is in the motor operated position 12 and configured for releasing the connection between motor 5 and the wheel 7 only when the rotating arm 8 is in the manually operated position 13. The axis engage means 9 is slidable between a first position in which the motor 5 is torque-proof connected to the wheel 7 and a second position in which the connection of the motor 5 is released from the wheel 7. A kinematic means 10 e.g., a disengage spring is adapted to move the axis engage means 9 from the first position to the second position when the rotating arm 8 is in the manually operated position 13. During manual operation the wheel 7 with the wheel drum 6 is disconnected from the drive shaft 14 of the motor 5 and can spin freely on two separate wheel bearings 22. When switching to manual operation under load, the axis engage means 9 will stay connected to the drive shaft 14, due to friction, until the wheel 7 is manually rotated using the handle 17 and the rotating arm 8.

Figure 4:
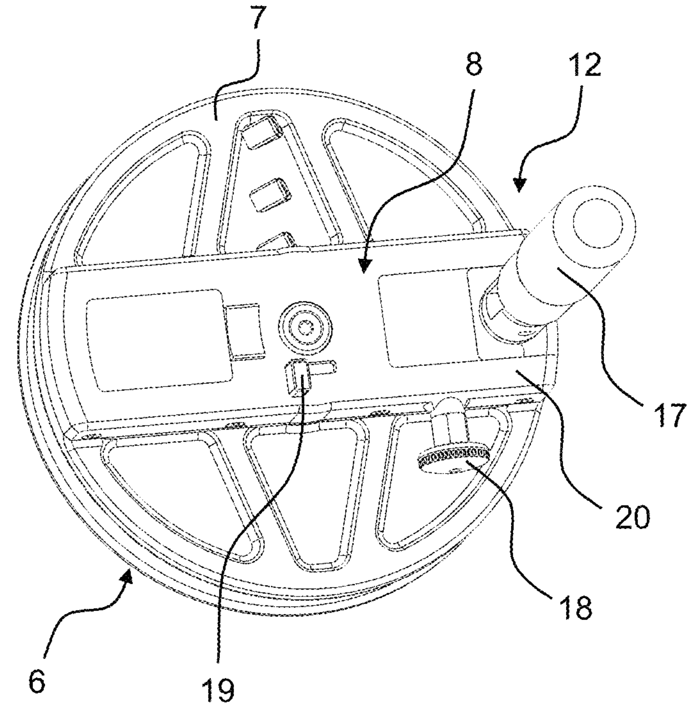
FIG. 4 shows a perspective view of a wheel of the motor unit with a rotating arm in a motor operated position according to an embodiment of the invention.
Figure 5:
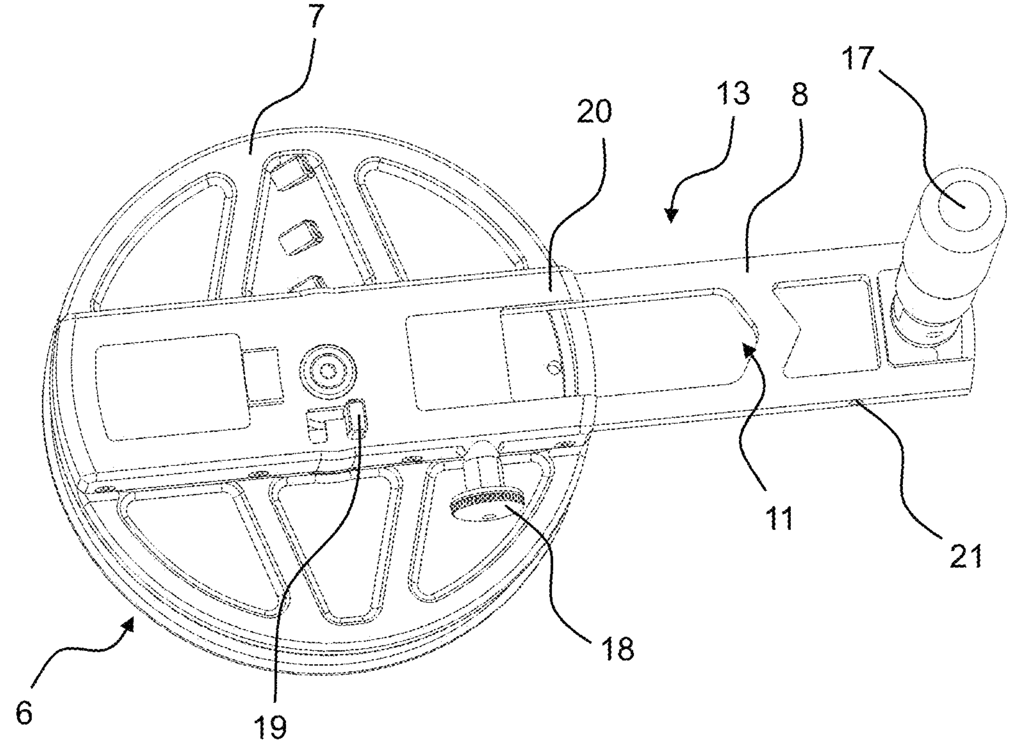
FIG. 5 shows a perspective view of a wheel of the motor unit with a rotating arm is in a manually operated position to a currently preferred embodiment of the invention.

FIGS. 4 and 5 show detailed views of the wheel 7, with FIG. 4 showing the wheel 7 with the rotating arm 8 in a motor operated position 12 and FIG. 5 in a manually operated position 13 according to embodiments of the invention. FIG. 4 initially shows that the rotating arm 8 is still retracted, and the retractable handle 17 is folded out. The rotating arm 8 is kept in position by means of a lock 18. After actuating the lock 18, the rotating arm 8 can be pulled out until the manually operated position 13 of the rotating arm 8 is reached.

FIG. 5 shows a perspective view of a wheel 7 of the motor unit 4 with a rotating arm 8 in a manually operated position 13. The arm 8 is also secured in this position by the lock 18. Since the rotating arm 8 is in the manually operated position 13 the axis engage means 9 can now release the connection between motor 5 and the wheel 7. In the embodiment shown in FIGS. 4 and 5, a disengage lever 19 is shown. The disengage lever 19 is operable from outside the wheel 7 and is arranged to move the axis engage means 9 from the first position to the second position by means of the kinematic means 10 when manually operated. This disengage lever 19 can be especially useful if the axis engage means 9 hooks or is jammed.

Figure 6:
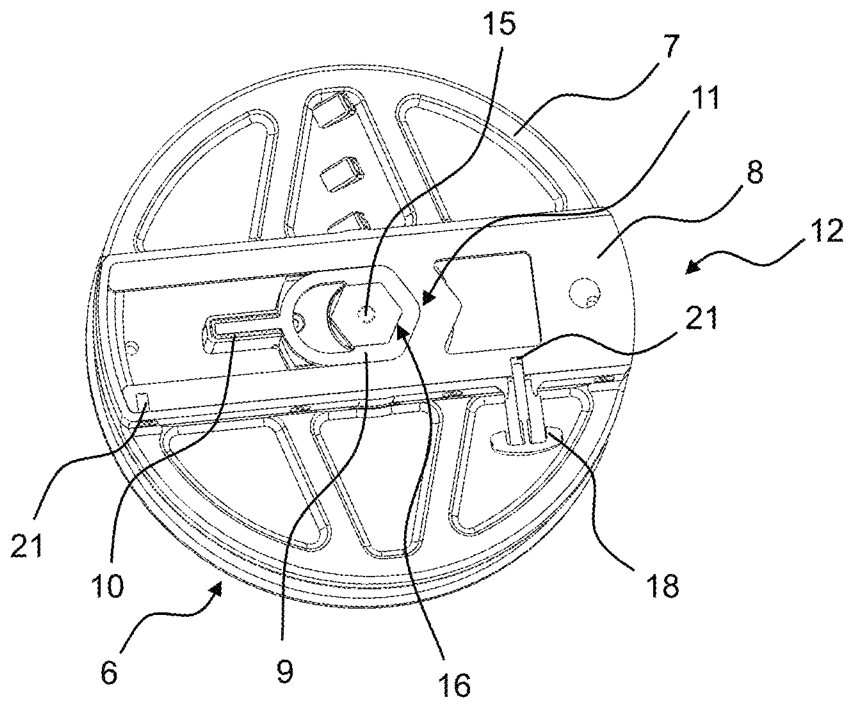
FIG. 6 shows a sectional view of a wheel of the motor unit with a rotating arm in a motor operated position according to an embodiment of the invention.
Figure 7:
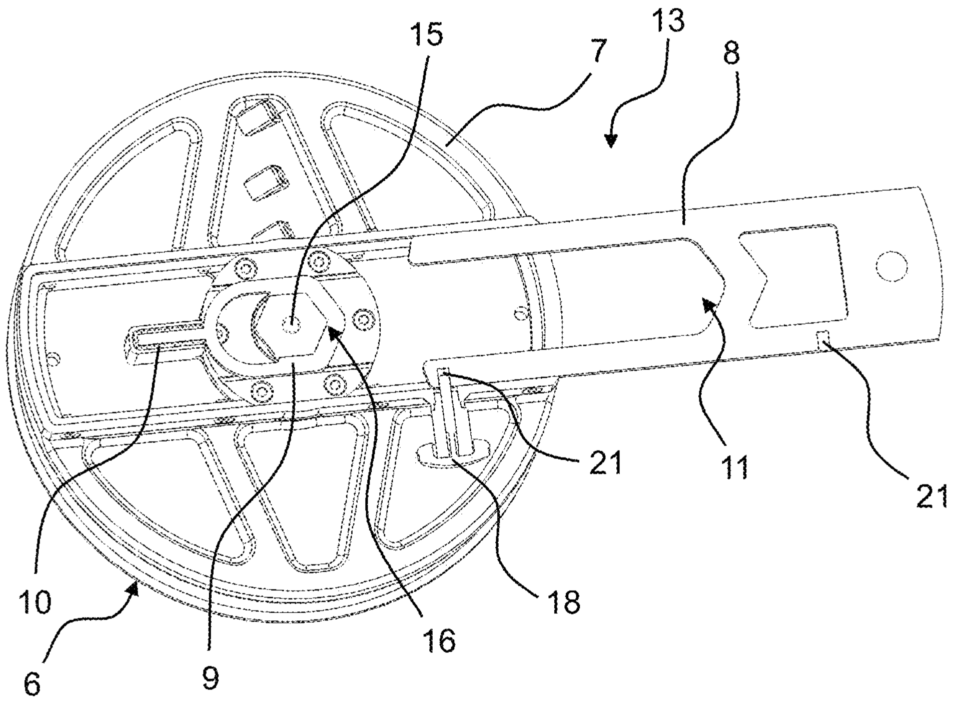
FIG. 7 shows a sectional view of a wheel of the motor unit with a rotating arm in a manually operated position and an axis engage means in a first position according to an embodiment of the invention.
Figure 8:
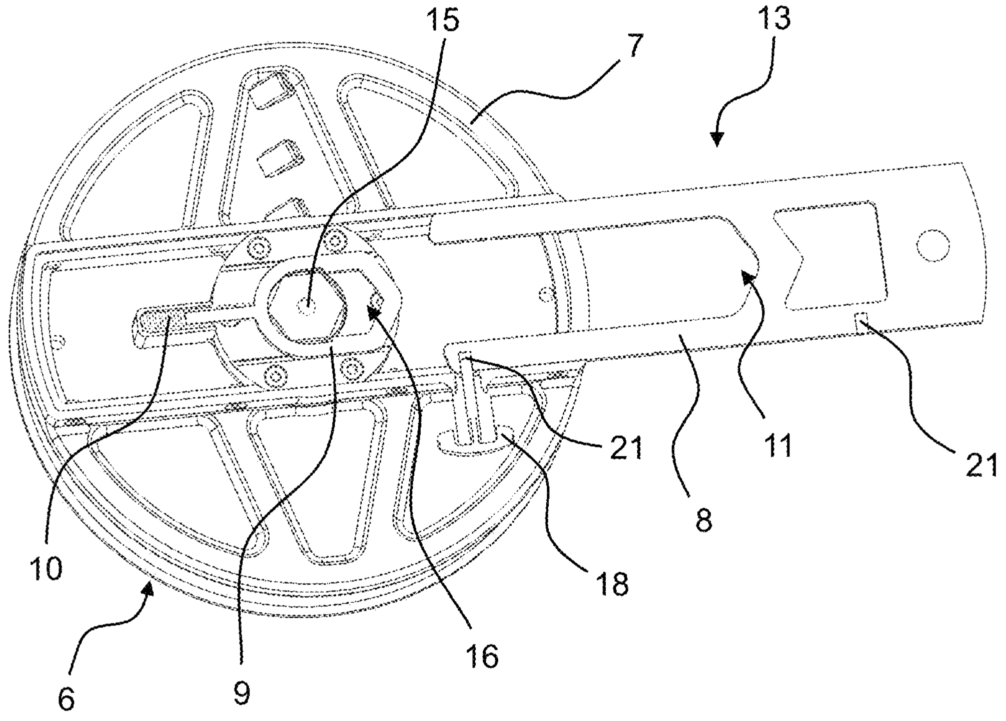
FIG. 8 shows a sectional view of a wheel of the motor unit with a rotating arm in a manually operated position according and an axis engage means in a second position to an embodiment of the invention.

The exact operation of the axis engage means 9 is shown in FIGS. 6, 7 and 8 and is described in more detail below. FIGS. 6, 7 and 8 show sectional drawings in which the cover 20 of the wheel 7 has been removed for better understanding.

FIG. 6 shows a sectional view of a wheel 7 of the motor unit with a rotating arm 8 in the motor operated position 12 according to an embodiment of the invention. In FIG. 6 the end section 15 of the drive shaft 14, which forms a torque-proof connection with the axis engage means 9 is shown. The axis engage means 9 is slidably arranged within the wheel 7 between a first position and a second position. Whereby, in the first position, the axis engage means 9 enters into the torque-proof connection with the end section 15 of drive shaft 14 and, in the second position, the torque-proof connection is released and the wheel 7 with the wheel drum 6 is free to rotate. To connect the wheel 7 to the drive shaft 14, the axis engage means 9 includes two areas. The first area is designed to form a torque-proof connection with the drive shaft 14 in the first position of the axis engage means 9. The second area releases the connection between the drive shaft 14 and the wheel 7 when the axis engage means 9 is in the second position. When the axis engage means 9 is in the second position, the wheel drum 6 can rotate freely. In FIG. 6 it is further shown that the rotating arm 8 includes a recess 11, the recess 11 at least partially positively engaging around the axis engage means 9 when the rotating arm 8 is in the motor operated position 12, thereby holding the axis engage means 9 in the first position.

In an embodiment of the invention the lock 18 has a detent mechanism 21 with a kinematic means for locking the rotating arm 8 in the motor operated position 12 or in the manually operated position 13.

In one embodiment, the end section 15 of the drive shaft 14 is designed hexagonal and the axis engage means 9 includes a receptacle 16 in the first portion that forms a positive and thus torque-proof connection with the hexagonal end section 15 when the axis engage means 9 is in the first position. Furthermore, FIG. 6 shows a kinematic means 10 e.g., a disengage means adapted to move the axis engage means 9 from the first position to the second position when the rotating arm 8 is in the manually operated position 13.

In an alternative embodiment, however, the end section 15 may have any shape that allows it to connect with the axis engage means 9. Other types of connections, such as shaft-hub connections, may also be provided to transmit torque and power from the drive shaft 14 to the axis engage means 9.

FIG. 7 shows a sectional view of a wheel 7 of the motor unit 4 with a rotating arm 8 in a manually operated position and an axis engage means in a first position according to an embodiment of the invention. If the user of the telescopic pole assembly 1 wants to switch the assembly from motor operation of the wheel to manual operation of the wheel, he first pulls out the rotating arm 8 radially. If the wheel 7 includes a lock 18, the user first releases the lock 18 and pulls out the rotating arm 8 until the lock 18 engages the rotating arm 8 in a second position. The recess 11 in the rotating arm then releases the axis engage means 9. Now, for example, a disengage spring 10 can move the axis engage means 9 from the first position to the second position. In particular, it can be provided that the axis engage means 9 is adapted to remain connected to the drive shaft 14 due to friction when the rotating arm 8 is extended until the wheel 7 is manually turned with the handle 17, whereby the kinematic means 10 moves the axis engage means 9 from the first position of the axis engage means 9 to the second position of the axis engage means 9. In particular, it can be provided that the axis engage means 9 initially remains in the first position when the rod is loaded with a load. Only when the rotating arm 8 is actuated, the pressure is taken from the connection between the drive shaft 14 and the wheel 7 whereby the friction is reduced, and the kinematic means 10 moves the axis engage means 9 into the second position. This ensures that the wheel 7 can only run freely when the rotating arm 8 is actuated. This can prevent, for example, the connection between the drive shaft 14 and the wheel 7 from being severed when the rotating arm 8 is pulled out and the entire load rests on the wheel drum 6 via the rope 3. Accidents can be prevented by this.

FIG. 8 shows a sectional view of the wheel 7 of the motor unit with a rotating arm 8 in a manually operated position according and an axis engage means in a second position to an embodiment of the invention. In FIG. 8, the axis engage means 9 is shown in the second position, where the connection between the drive shaft 14 and the wheel 7 has been released and the wheel 7 is free to rotate. In an embodiment, if the axis engage means 9 is not moved to the second position by the kinematic means 10 even after actuation of the rotating arm 8, the wheel 7 may include the disengage lever 19 shown in FIGS. 4 and 5.

A corresponding method for switching between a manual operation and a motor operation of a telescopic pole assembly 1 is explained below. First a motor unit 4 as described above is provided, wherein the wheel 7 comprises a disengage lever 19 configured for releasing the torque-proof connection between motor 5 and wheel 7 upon activation the disengage lever 19 by means of the axis engage means 9 when the rotating arm 8 is in the manually operated position 13 by pushing the disengage lever 19 from a first position to a second position. The disengage lever 19 is subsequently in the second position. In the next step the disengage lever 19 is pushed back towards its first position, while rotating the wheel 7 to find a correct angle for alignment of the axis engage means 9 for the torque-proof connecting between the motor 5 and the wheel 7. When the axis engage means 9 is aligned for the torque-proof connecting between the motor 5 and the wheel 7, the disengage lever 19 is pushed all the way to its first position. Once the disengage lever 19 is in its first position, a holding force may be released from the rotating arm 8 and the axis engage means 9 will start to transfer a torque to the motor 5 by means of the torque-proof connecting between the motor 5 and the wheel 7. In the final step the rotary arm 8 of the wheel 7 of the motor unit 4 is axially retraced into the motor operated position 13. If a switch is to be made from manual operation to motor operation under load, the disengage lever 19 is helpful in ensuring that a secure torque-proof connection has been made between the motor 5 and the wheel 7. After that a holding force may be released from the rotating arm 8 and the axis engage means 9 will start to transfer a torque to the motor 5 by means of the torque-proof connecting between the motor 5 and the wheel 7.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope. Further, for the sake of clearness, not all elements in the drawings may have been supplied with reference signs.

REFERENCE SYMBOL LIST telescopic pole assembly 1
telescopic pole 2
rope 3
motor unit 4
motor 5
wheel drum 6
wheel 7
rotating arm 8
axis engage means 9
disengage spring 10
recess 11
motor operated position 12
manually operated position 13
drive shaft 14
end section of drive shaft 15
receptacle 16
manual handle 17
lock 18
disengage lever 19
coverage 20
detent mechanism 21
wheel bearings 22
gearbox 23
pole sections 24
base plate 25
hook 26

The invention claimed is:

1. A motor unit configured for actuating a rope of a telescoping pole assembly comprising a telescopic pole, comprising a motor, a wheel comprising a rotatable wheel drum for receiving the rope, the wheel further comprising a rotating arm for manually operating the wheel, which rotating arm is axially extendable between a motor operated position and a manually operated position, a slidable axis engage means configured for torque-proof connecting the motor and the wheel in a first position only when the rotating arm is in the motor operated position and configured for releasing the connection between motor and the wheel in a second position only when the rotating arm is in the manually operated position, and a kinematic means configured to move the axis engage means from the first position to the second position when the rotating arm is in the manually operated position.

2. The motor unit according to claim 1, wherein the rotating arm comprises a recess configured for securing the torque-proof connection between the motor and the wheel by means of the axis engage means when the rotating arm is in motor operated position.

3. The motor unit according to claim 1, wherein the motor unit comprises a drive shaft arranged between the motor and wheel, and the axis engage means is positively connected to the drive shaft in the first position thereby establishing the torque-proof connection between motor and wheel.

4. The motor unit according to claim, 3 wherein an end section of the drive shaft is hexagonal in shape and the axis engage means includes a receptacle corresponding in shape to thereby providing the torque-proof connection between the drive shaft and the drum wheel.

5. The motor unit according to claim 1, wherein the wheel comprises a manual handle retractably connected to the rotating arm configured for manually rotating the wheel by the rotating arm when the rotating arm is in the manually operated position.

6. The motor unit according to claim 1, wherein the wheel comprises a lock configured for locking the rotating arm in the motor operated position or in the manually operated position.

7. The motor unit according to claim 6, wherein the lock has a detent mechanism with a kinematic means configured for locking the rotating arm in the motor operated position or in the manually operated position.

8. The motor unit according to claim 7, wherein the wheel comprises a disengage lever configured for releasing the torque-proof connection between motor and wheel upon activation the disengage lever, by means of the axis engage means when the rotating arm is in the manually operated position.

9. A telescopic pole assembly comprising a telescopic pole with a rope connected thereto and the motor unit according to claim 1.

10. A method for switching between a motor operation and a manual operation of a telescopic pole assembly, the method comprising the following steps:

Providing a motor unit according to claim 1,

Axially extending the rotary arm of the wheel of the motor unit into the manually operated position, Rotating the rotating arm, by which the axis engage means is moved from the first position in which the motor is torque-proof connected to the wheel to the second position in which the connection of the motor is released from the wheel by means of the kinematic means.

11. The method according to claim 10, wherein the wheel comprises a disengage lever, the method comprising the following additional step:

Actuating the disengage lever in case the axis engage means is jammed whereby the axis engage means is moved from the first position to the second position by means of the kinematic means.

12. A method for switching between a manual operation and a motor operation of a telescopic pole assembly, the method comprising the following steps:

Providing a motor unit according to claim 1, wherein the wheel comprises a disengage lever configured for releasing the torque-proof connection between motor and wheel upon activation of the disengage lever by means of the axis engage means when the rotating arm is in the manually operated position by pushing the disengage lever from a first position to a second position, the disengage lever being subsequently in the second position, Pushing back the disengage lever towards its first position, while rotating the wheel to find a correct angle for alignment of the axis engage means for the torque-proof connecting between the motor and the wheel, Pushing the disengage lever all the way to its first position, when the axis engage means is aligned for the torque-proof connecting between the motor and the wheel, wherein once the disengage lever is in its first position, a holding force may be released from the rotating arm and the axis engage means will start to transfer a torque to the motor by means of the torque-proof connecting between the motor and the wheel, Axially retracing the rotary arm of the wheel of the motor unit into the motor operated position.

* * * * *